(12) United States Patent
Sullivan

(10) Patent No.: US 10,801,598 B2
(45) Date of Patent: Oct. 13, 2020

(54) HYBRID AXLE DRIVE WITH TORQUE VECTORING

(71) Applicant: Ford Global Technologies, LLC, Dearborn, MI (US)

(72) Inventor: Jonathan Sullivan, Ferndale, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 108 days.

(21) Appl. No.: 16/183,034

(22) Filed: Nov. 7, 2018

(65) Prior Publication Data

US 2020/0141477 A1    May 7, 2020

(51) Int. Cl.
| | |
|---|---|
| *B60K 6/52* | (2007.10) |
| *F16H 48/36* | (2012.01) |
| *B60K 6/48* | (2007.10) |
| *B60K 6/365* | (2007.10) |

(52) U.S. Cl.
CPC .............. *F16H 48/36* (2013.01); *B60K 6/365* (2013.01); *B60K 6/48* (2013.01); *B60K 6/52* (2013.01); *B60Y 2200/92* (2013.01); *F16H 2048/368* (2013.01)

(58) Field of Classification Search
CPC ... F16H 48/36; F16H 2048/368; B60K 6/365; B60K 6/48; B60K 6/52; B60Y 2200/92
See application file for complete search history.

(56) References Cited

U.S. PATENT DOCUMENTS

| | | | |
|---|---|---|---|
| 7,238,140 B2 | 7/2007 | Gradu | |
| 8,272,989 B2* | 9/2012 | Baasch | B60K 17/165 475/150 |
| 8,545,359 B2* | 10/2013 | Kato | B60K 17/165 475/150 |
| 2006/0172847 A1 | 8/2006 | Gradu | |
| 2016/0146322 A1* | 5/2016 | Knoblauch | B60K 1/00 475/150 |
| 2017/0227105 A1* | 8/2017 | Pinschmidt | B60K 6/52 |
| 2017/0313172 A1* | 11/2017 | Meixner | B60K 6/365 |
| 2018/0172124 A1* | 6/2018 | Valente | B60K 17/356 |

FOREIGN PATENT DOCUMENTS

EP    2057030 B1    7/2010

* cited by examiner

*Primary Examiner* — David J Hlavka
(74) *Attorney, Agent, or Firm* — David Kelley; Brooks Kushman, P.C.

(57) ABSTRACT

An electric axle drive utilizes an electric motor to propel both half-shafts via final drive gearing and a differential. Torque vectoring gearing alters the torque distribution by transmitting power from one of the half shafts to the motor or from the motor to the half-shaft in response to engagement of brakes. Both the final drive gearing and the torque vectoring gearing are implemented using stepped planetary gear sets. The final drive gearing and differential are located on one end of the electric motor. The torque vectoring gearing is located on the opposite end of the electric motor.

14 Claims, 2 Drawing Sheets

FIG. 1 – PRIOR ART

HYBRID AXLE DRIVE WITH TORQUE VECTORING

TECHNICAL FIELD

This disclosure relates to the field of vehicle powertrains. More particularly, the disclosure pertains to an arrangement of components in a hybrid axle drive having torque vectoring capability.

BACKGROUND

Many modern vehicles include electric propulsion instead of or in addition to an internal combustion engine. The electric propulsion motors are often powered by batteries. Some powertrains include multiple motors configured such that one motor acts as a generator providing electrical power to another motor. The motors are often used to recover energy during braking maneuvers and later utilize the recovered energy to propel the vehicle. Some electric vehicles have provisions to charge the battery from the electrical grid.

One type of electric propulsion system utilizes a motor as part of an axle assembly. The axle assembly may drive either the front wheels or the rear wheels. An electric axle drive typically includes a differential that distributes power from a traction motor to the two wheels while allowing the wheels to rotate at slightly different speeds, such as when turning a corner. The differential delivers approximately equal torque to each wheel.

FIG. 1 illustrates one exemplary type of powertrain that utilizes an Electric Rear Axle Drive (ERAD). Primary power is provided by internal combustion engine 10. Transaxle 12 adapts the speed and torque based on current vehicle needs and delivers the power to left and right front wheels 14 and 16 respectively. Front End Accessory Drive (FEAD) 18 includes an alternator or generator that converts some of the energy from engine 10 to electricity and stores it in battery 20. FEAD 18, battery 20, and inverter 22 are electrically connected by a Direct Current (DC) electric bus 24. Inverter 22 delivers Alternating Current (AC) power to ERAD 26 at a frequency, phase, and magnitude calculated to produce a desired torque. ERAD 26 divides the power between left half-shaft 28 and right half-shaft 30 driving left and right rear wheels 32 and 34 respectively. Controller 36 sends and receives control signals from a number of components including at least engine 10, transaxle 12, inverter 22, and ERAD 26.

SUMMARY

An electric drive axle includes a differential, an electric machine, final drive gearing, and torque vectoring gearing. The differential has an input and is configured to transmit power from the input to first and second half-shafts. The electric machine has a rotor. The final drive gearing fixedly establishes a power flow path from the rotor to the differential input. The final drive gearing may include a stepped planetary gearset with a carrier fixedly coupled to the differential input, a sun gear fixedly coupled to the rotor, a ring gear fixedly held against rotation, and stepped planets meshing with the sun gear and ring gear. The torque vectoring gearing transmits power from the rotor to the first half-shaft in response to application of a first friction element while the first half-shaft is rotating faster than the differential input. This reduces the power transmitted via the power flow path. The torque vectoring gearing also transmits power from the first half-shaft to the rotor in response to application of a second friction element while the first half-shaft is rotating slower than the differential input. This increases the power transmitted via the power flow path. The torque vectoring gearing may include a stepped planetary gearset and two friction elements, such as multi-plate brakes. A carrier is fixedly coupled to the first half-shaft. A sun gear is fixedly coupled to the rotor. A first ring gear is selectively held against rotation by the first friction element. A second ring gear selectively held against rotation by the second friction element. The stepped planets mesh with the sun gear and both of the ring gears. The torque vectoring gearing and the final drive gearing may be located on opposite sides of the electric machine.

An electric axle drive includes a differential, a motor with a rotor, final drive gearing, and torque vectoring gearing. The differential has an input and drives two half-shafts. The final drive gearing fixedly establishes a final drive speed ratio between the rotor and the differential input. The torque vectoring gearing selectively alternatively establish first and second fixed speed ratios between the rotor and one of the two half-shafts. The final drive ratio is between the first and second speed ratios.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotatable elements are fixedly coupled to one another if they are constrained to have the same rotational speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two or more rotatable elements are selectively coupled by a shift element when the shift element constrains them to have the same rotational speed about the same axis whenever it is fully engaged and they are free to have distinct speeds in at least some other operating condition. Two rotatable elements are driveably connected if they are connected by a power flow path that constrains their rotational speeds to be proportional with a fixed speed ratio. If the power flow path is established in all operating conditions, then the components are fixedly driveably connected. If the power flow path is established only when one or more shift elements are engaged, then the components are selectively driveably connected.

Figure 1:
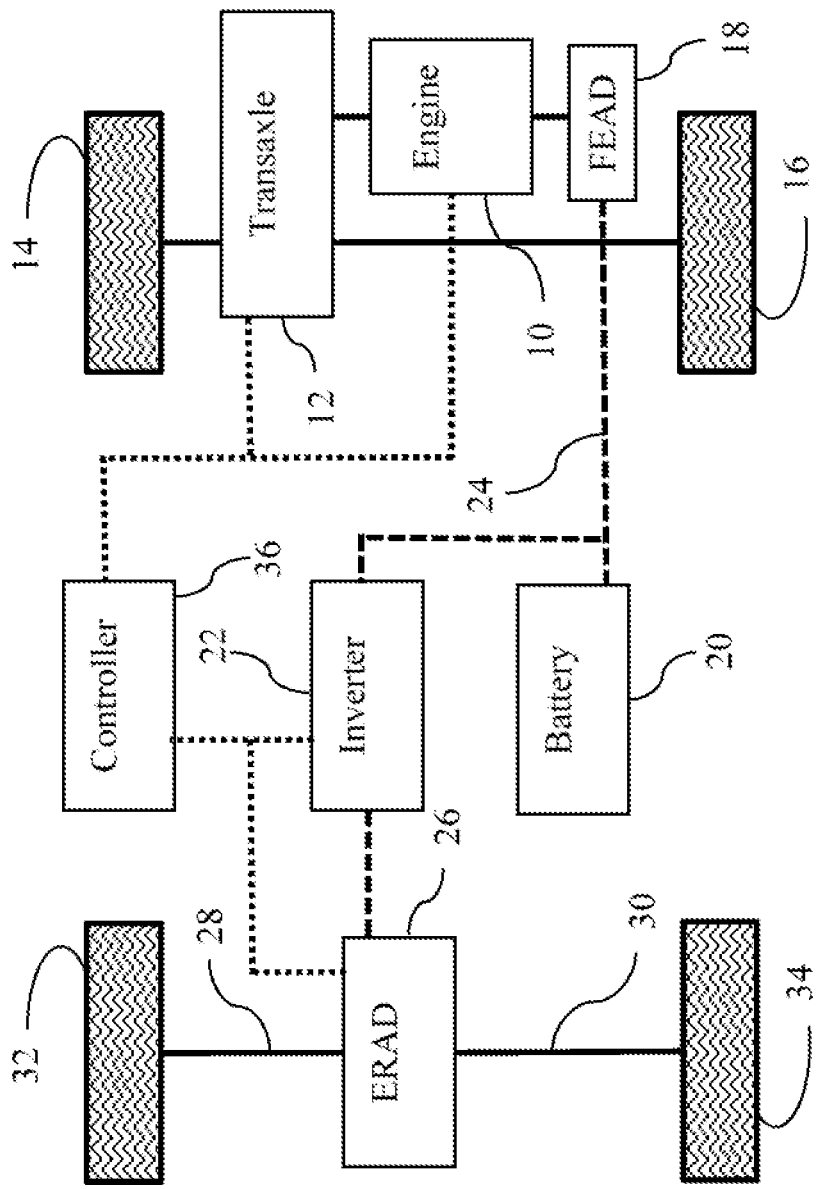
FIG. 1 schematically illustrates a vehicle powertrain.
Figure 2:
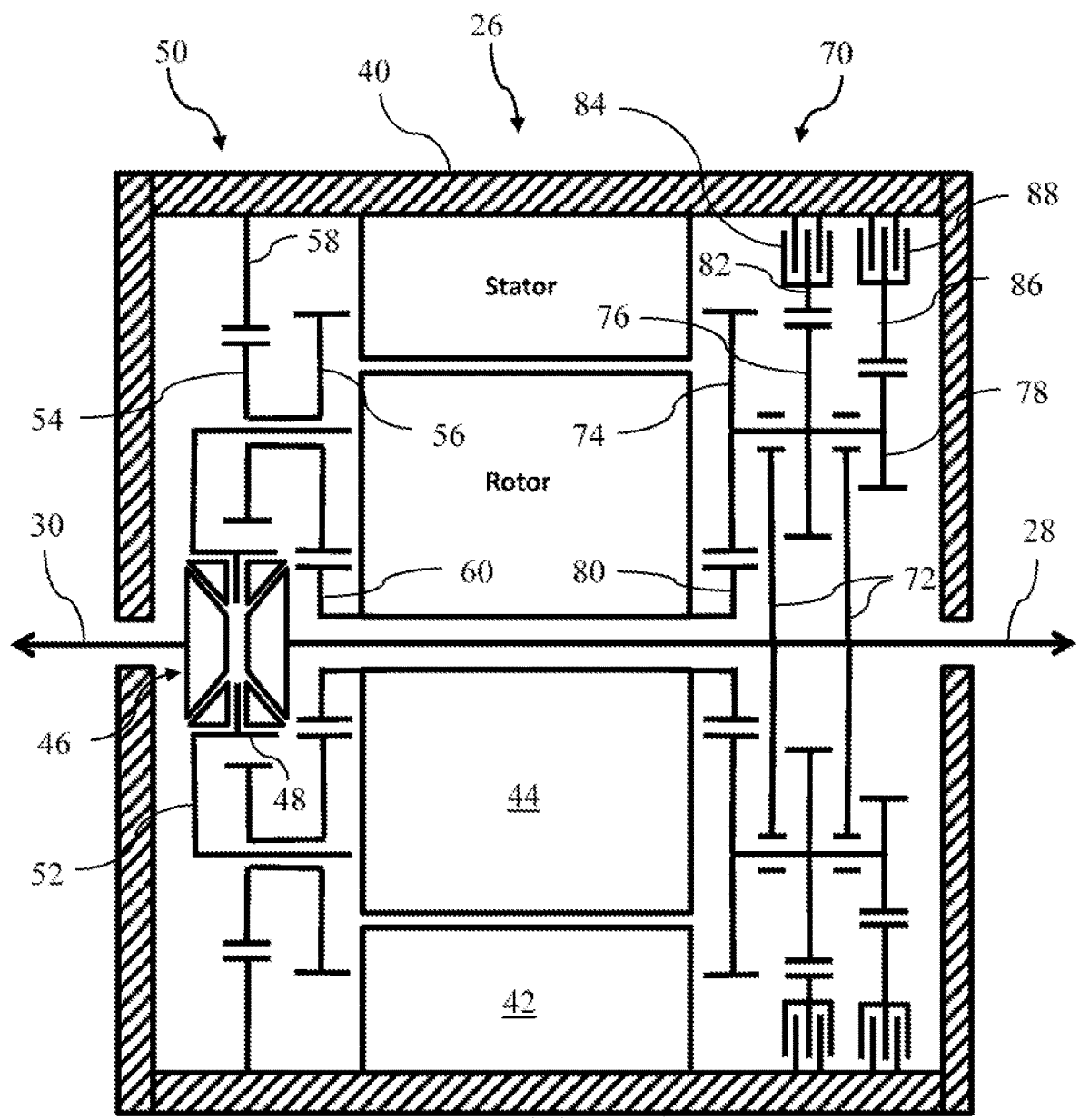
FIG. 2 illustrates a torque vectoring electric axle drive.

FIG. 2 illustrates an embodiment of ERAD 26 in more detail. The components are contained within a housing 40 which is mounted to vehicle structure. Propulsive power and regenerative braking are provided primarily by a traction motor. The stator 42 of the traction motor is fixed to housing 40. The rotor 44 of the traction motor is supported for rotation about half-shaft 28. In other words, rotor 44 is hollow and half-shaft 28 passes through rotor 44. A differential 46 divides power between a differential input 48 and half-shafts 28 and 30, allowing slight speed differences between the half-shafts such as when the vehicle turns a corner. The differential delivers equal torque to each half-shaft. In FIG. 2, a bevel gear differential is shown. Other types of differentials, such as double pinion planetary differentials may also be used.

Final drive gearing 50 directs power from the rotor 44 to the differential input at a fixed speed ratio. The torque ratio is also fixed except for the impact of parasitic losses. The final drive gearing is a stepped pinion planetary gear set. The gear set includes carrier 52 which is fixedly coupled to the differential input 48. A set of stepped planets are supported for rotation with respect to carrier 52. Each stepped planet includes two gears 54 and 56. The pitch diameter of gear 54 is less than the pitch diameter of gear 56. Gear 54 meshes with internal gear teeth of ring gear 58 which is fixed to housing 40. Gear 56 meshes with sun gear 60 which is fixedly coupled to rotor 44.

Torque vectoring gearing 70 selectively directs power between the rotor 44 and half-shaft 28. Like the final drive gearing, the torque vectoring gearing is a stepped pinion planetary gear set. Carrier 72 which is fixedly coupled to the half-shaft 28. A set of stepped planets are supported for rotation with respect to carrier 72. Each stepped planet includes three gears 74, 76, and 78. Gear 74 meshes with sun gear 80 which is fixedly coupled to rotor 44. Gear 76 meshes with internal gear teeth of ring gear 82 which is selectively coupled to housing 40 by brake 84. Gear 78 meshes with internal gear teeth of ring gear 86 which is selectively coupled to housing 40 by brake 88. Preferably, the pitch diameter ratio of gear 74 to sun gear 80 is equal to the pitch diameter ratio of gear 56 to sun gear 60. When the speeds of the half-shafts are equal, the speeds of the stepped planets in torque vectoring gear set 70 are equal to the speeds of the stepped planets in final drive gear set 50. The pitch diameter of gear 76 is larger than the pitch diameter of gear 54 and the pitch diameter of gear 78 is smaller than the pitch diameter of gear 54. As a result, when the speeds of the half-shafts are equal, ring gear 82 rotates in the opposite direction of the half-shafts and ring gear 86 rotates in the same direction as the half-shafts. The pitch diameters are selected such that these direction of rotation relationships exist even when the speeds of the half-shafts differ by some percentage such as 30%.

When the vehicle is being driven on a straight road, controller 36 determines the driver demanded torque based on the position of a driver operated accelerator pedal and other sensed parameters such as vehicle speed. The controller decides what portion of the driver demanded wheel torque should be delivered front wheels by engine 10 and transmission 12 and what portion should be delivered to the rear wheels by ERAD 26. Then, the controller determines how much of the electrical energy required by the ERAD should be derived from FEAD 18 as opposed to drawing from stored energy in battery 20. Finally, the controller sends control signals to engine 10, transmission 12, and inverter 22 to effectuate these torque levels. In the case of total wheel torque delivered to the rear wheels by ERAD 26 is controlled by adjusting the magnitude, frequency, and phase angle of the alternating current supplied by inverter 22. In this condition, brakes 84 and 88 are commanded off such that the torque supplied to the left rear wheel is equal to the torque supplied to the right rear wheel.

When the vehicle turns left on a road surface that provides good traction, right rear tire 34 rotates faster than left rear tire 32. Consequently, half-shaft 30 and differential input 48 rotate faster than half-shaft 28. Some of the turning moment may be provided by delivering more torque to the right rear wheel 34 than to the left rear wheel 32 (with the remainder provided by turning the front wheels). Controller 36 accomplishes this by commanding application of brake 88. Reaction torque at brake 88 established a power flow path that sends power from half-shaft 28 to rotor 44, thereby reducing the total torque delivered to left rear wheel 32. Some of the power that is drawn from half-shaft 28 is dissipated by slipping brake 88. The power delivered back to rotor 44 is divided between half-shaft 28 and half-shaft 30.

For example, suppose that the torque ratio associated with the final drive gearing 50 is 3.0 and the torque ratio associated with the power flow path established by brake 88 is 3.5. If the motor generates 100 Nm, 300 Nm is delivered at differential input 48 and differential 46 delivers 150 Nm to each half-shaft. Now, if the torque capacity of brake 88 is sufficient to draw 35 Nm from half-shaft 28, 10 Nm would be exerted on rotor 44 by sun gear 80. That 10 Nm will flow through the final drive gearing to increase the torque on differential input 48 by 30 Nm and increase the torque on each half-shaft by 15 Nm. On net, the torque on left half-shaft 28 is 150 Nm−35 Nm+15 Nm=130 Nm. The torque on right half-shaft 30 is 150 Nm+15 Nm=165 Nm. Note that the average torque delivered to the wheels is slightly less than the average torque of 150 Nm that would be delivered with no torque vectoring. That is because some power is dissipated by slipping brake 88. However, the amount of power dissipated is considerably less than if the torque difference was induced by applying a left rear wheel brake.

Similarly, when the vehicle turns right on a road surface that provides good traction, right rear tire 34 rotates slower than left rear tire 32. Consequently, half-shaft 28 and differential input 48 rotate faster than half-shaft 30. Controller 36 may provide a turning moment by delivering more torque to the left rear wheel 32 than to the right rear wheel 34. To accomplish this, controller 36 commands application of brake 84. Reaction torque at brake 84 establishes a power flow path that sends power from rotor 44 to half-shaft 28, thereby increasing the total torque delivered to left rear wheel 32. The power delivered through this torque path reduces the power delivered to differential input 48 via the final drive gearing 50.

For example, suppose that the torque ratio associated with the final drive gearing 50 is 3.0 and the torque ratio associated with the power flow path established by brake 84 is 2.5. If the torque capacity of brake 84 is sufficient to draw 10 Nm from rotor 44 via sun gear 80, then 25 Nm would be exerted on half-shaft 28 by carrier 72. If the motor is generating 100 Nm, then the remaining 90 Nm is transmitted to sun gear 50, resulting in 270 Nm to differential input 48 and 135 Nm to each half-shaft. On net, the torque on left half-shaft 28 is 135 Nm+25 Nm=160 Nm. The torque on right half-shaft 30 is 135 Nm. Again, note that, since some power is dissipated in slipping brake 84, the average torque delivered to the wheels is slightly less than the average torque of 150 Nm that would be delivered with no torque vectoring. However, the amount of power dissipated is considerably less than if the torque difference was induced by applying a right rear wheel brake.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. An electric axle drive comprising:
    a differential having an input and configured to transmit power from the input to first and second half-shafts;
    an electric machine having a rotor;
    final drive gearing fixedly establishing a power flow path from the rotor to the differential input; and
    torque vectoring gearing configured to
        transmit power from the rotor to the first half-shaft in response to application of a first friction element while the first half-shaft is rotating faster than the differential input, to reduce the power transmitted via the power flow path, and
        transmit power from the first half-shaft to the rotor in response to application of a second friction element while the first half-shaft is rotating slower than the differential input, to increase the power transmitted via the power flow path;
    wherein the torque vectoring gearing includes:
        a carrier fixedly coupled to the differential input;
        a sun gear fixedly coupled to the rotor;
        a ring gear fixedly held against rotation; and
        a plurality of stepped planets supported for rotation with respect to the carrier and having a first gear in meshing engagement with the sun gear and a second gear in meshing engagement with the ring gear.

2. The electric axle drive of claim 1 wherein the plurality of stepped planets having a third gear in meshing engagement with the second ring gear.

3. The electric axle drive of claim 1 wherein the first and second friction elements are multi-plate brakes.

4. The electric axle drive of claim 1 wherein the torque vectoring gearing is located on a first side of the electric machine and the final drive gearing and differential are located on a second side of the electric machine opposite the first side.

5. An electric axle drive comprising:
    a differential having an input and driving two half-shafts;
    a motor having a rotor;
    final drive gearing fixedly establishing a final drive speed ratio between the rotor and the differential input; and
    torque vectoring gearing configured to selectively alternatively establish first and second fixed speed ratios between the rotor and one of the two half-shafts, the final drive ratio being between the first and second speed ratios.

6. The electric axle drive of claim 5 wherein the final drive gearing comprises:
    a carrier fixedly coupled to the differential input;
    a sun gear fixedly coupled to the rotor;
    a ring gear fixedly held against rotation; and
    a plurality of stepped planets supported for rotation with respect to the carrier and having a first gear in meshing engagement with the sun gear and a second gear in meshing engagement with the ring gear.

7. The electric axle drive of claim 5 wherein the torque vectoring gearing comprises:
    a carrier fixedly coupled to one of the two half-shafts;
    a sun gear fixedly coupled to the rotor;
    a first ring gear selectively held against rotation by a first brake;
    a second ring gear selectively held against rotation by a second brake; and
    a plurality of stepped planets supported for rotation with respect to the carrier and having a first gear in meshing engagement with the sun gear, a second gear in meshing engagement with the first ring gear, and a third gear in meshing engagement with the second ring gear.

8. The electric axle drive of claim 7 wherein the first and second brakes are multi-plate friction brakes.

9. The electric axle drive of claim 5 wherein the torque vectoring gearing is located on a first side of the motor and the final drive gearing and differential are located on a second side of the motor opposite the first side.

10. An electric axle drive comprising:
    a first carrier fixedly coupled to a half-shaft;
    a first sun gear fixedly coupled to a rotor of a motor;
    first and second ring gears each selectively held against rotation; and
    a plurality of first stepped planets, each first stepped planet having a first gear meshing with the first sun gear, a second gear meshing with the first ring gear, and a third gear meshing with the second ring gear.

11. The electric axle drive of claim 10 further comprising:
    a second carrier fixedly coupled to a differential input;
    a second sun gear fixedly coupled to the rotor;
    a third ring gear fixedly held against rotation; and
    a plurality of second stepped planets, each second stepped planet having a fourth gear meshing with the second sun gear and a fifth gear meshing with the third ring gear.

12. The electric axle drive of claim 11 wherein:
    a pitch diameter of the second gear is less than a pitch diameter of the fifth gear; and
    a pitch diameter of the third gear is greater than the pitch diameter of the fifth gear.

13. The electric axle drive of claim 12 wherein:
    a pitch diameter of the first gear is equal to a pitch diameter of the fourth gear; and
    a pitch diameter of the first sun gear is equal to a pitch diameter of the second sun gear.

14. The electric axle drive of claim 11 wherein the first carrier is located on a first side of the rotor and the second sun gear is located on a second side of the rotor opposite the first side.

* * * * *